(12) United States Patent
Poletti et al.

(10) Patent No.: US 9,516,544 B2
(45) Date of Patent: Dec. 6, 2016

(54) METHOD FOR MANAGING SERVICE POLICY IN A TELECOMMUNICATIONS NETWORK

(75) Inventors: Claude Poletti, Fontenay Aux Roses (FR); Marc Cartigny, Chatou (FR); Eric Souleres, Toulouse (FR)

(73) Assignee: AIRBUS DEFENCE AND SPACE SAS, Les Mureaux (FR)

( * ) Notice: Subject to any disclaimer, the term of this patent is extended or adjusted under 35 U.S.C. 154(b) by 115 days.

(21) Appl. No.: 13/996,301

(22) PCT Filed: Dec. 14, 2011

(86) PCT No.: PCT/EP2011/072784
§ 371 (c)(1),
(2), (4) Date: Jul. 23, 2013

(87) PCT Pub. No.: WO2012/084647
PCT Pub. Date: Jun. 28, 2012

(65) Prior Publication Data
US 2014/0293785 A1    Oct. 2, 2014

(30) Foreign Application Priority Data

Dec. 22, 2010 (FR) ..................................... 10 05036

(51) Int. Cl.
| | | |
|---|---|---|
| *H04L 29/06* | (2006.01) | |
| *H04L 12/927* | (2013.01) | |
| *H04W 28/02* | (2009.01) | |
| *H04L 12/911* | (2013.01) | |

(52) U.S. Cl.
CPC ........ *H04W 28/0289* (2013.01); *H04L 47/745* (2013.01); *H04L 47/80* (2013.01); *H04W 28/0205* (2013.01); *H04W 28/0268* (2013.01); *H04L 63/029* (2013.01); *H04L 63/105* (2013.01); *H04W 28/0284* (2013.01)

(58) Field of Classification Search
CPC ... H04L 12/5695; H04L 47/10; H04L 47/20; H04L 47/215; H04L 47/2441; H04L 47/29; H04L 47/805; H04L 63/029; H04L 63/105; H04L 47/80; H04W 28/0205; H04W 28/0284; H04W 28/0268
See application file for complete search history.

(56) References Cited

U.S. PATENT DOCUMENTS

| | | | |
|---|---|---|---|
| 7,701,948 B2 * | 4/2010 | Rabie et al. | 370/395.41 |
| 8,000,235 B2 * | 8/2011 | Noy et al. | 370/230 |
| 8,718,057 B1 * | 5/2014 | Rabie et al. | 370/390 |

FOREIGN PATENT DOCUMENTS

GB    2 430 834    4/2007

OTHER PUBLICATIONS

International Search Report for PCT/EP2011/072784 mailed Mar. 22, 2012.
Written Opinion of the International Searching Authority mailed Mar. 22, 2012.
A. Staikoa et al., "Protecting Premium Traffic in Colorless Core Backbone: Test Results", Military Communications Conference, 2007, MILCOM 2007, IEEE, Oct. 29, 2007, pp. 1-7.
K. Chang et al., "A Study on the Call Admission and Preemption Control Algorithms for Secure Wirelss As Hoc Networks Using IPSec Tunneling", MILCOM 2006, Oct. 23, 2006, pp. 1-7.
English language translation of Written Opinion of the International Searching Authority (Form PCT/IB/373) dated Jun. 25, 2013 (mailed Jul. 15, 2013).

* cited by examiner

*Primary Examiner* — Ayaz Sheikh
*Assistant Examiner* — Debebe Asefa
(74) *Attorney, Agent, or Firm* — Nixon & Vanderhye P.C.

(57) ABSTRACT

A method for managing the service policy applied to a black network comprising a radio link and to a red network connected to this black network managed by a predetermined set of profiles is proposed. The congestion of the radio link is detected by any means by the black domain. The congestion of the radio link is detected by a method for detecting congestion which operates by means of exchanges within the red domain. A service policy profile then established matches for each domain to a detected congestion level.

5 Claims, 4 Drawing Sheets

METHOD FOR MANAGING SERVICE POLICY IN A TELECOMMUNICATIONS NETWORK

This application is the U.S. national phase of International Application No. PCT/EP2011/072784 filed 14 Dec. 2011 which designated the U.S. and claims priority to FR 10/05036 filed 22 Dec. 2010, the entire contents of each of which are hereby incorporated by reference.

The present invention concerns the field of service quality control in a data telecommunication network.

Modern communication networks consist of a plurality of communication nodes connected together by communication links. These communication nodes include terminal equipment such as computer stations, mobile communication terminals or application servers. They also include intermediate equipment such as relays and routers that serve for interconnection and routing of the data traffic between the items of terminal equipment.

Communication links are based on a wide range of physical transmission technologies. Cabled technologies such as optical fibre, Ethernet links or the like and radio technologies according to a large panel of protocols such as WiFi, WiMax, satellite links or the like, can be cited. Each of these technologies leads to different properties concerning the transmission channel both in terms of available bandwidth and error rate or variability of this available bandwidth. At the present time, the dominant technology is a packet communication technology, typically the IP (Internet protocol) network.

These communication networks are used to implement a great diversity of services, such as voice communication exchange, typically so-called VoIP (Voice over IP) services, broadcasting of multimedia programs, typically television services, or access to videos on demand or access to data, typically access to web services.

These applications have bandwidth and latency requirements that are particular thereto. Packet transfer networks historically do not guarantee a given bandwidth or latency to a particular service. On the other hand, circuit communication networks are based on the establishment of a communication circuit between the end items of communicating equipment that guarantees bandwidth and latency between these items of equipment, as soon as the circuit is established. One example of such circuit networks is the switched telephone network.

To enable the development of services having constrained requirements in terms of bandwidth and/or latency on packet communication networks, a set of technologies have been developed and are known, among other things, by the term QOS (Quality Of Service). These technologies are based on the definition of a set of service categories subject to the communication constraints. The network is partitioned into security domains applying a service quality policy. The data packets entering the domain are marked according to the category of the service that sends them (colouring), the data streams are admitted or refused at the entry, and their rate may be regulated (policing). Priorities are attributed to the various categories and the intermediate items of equipment of the network that deal with congestion use these priorities in order to eliminate the ones with the lowest priority and favour the transmission of packets belonging to the data streams with the highest priority. These technologies are supplemented by other mechanisms such as access control lists (ACL), routing rules, services admission and the like, in order to form a service policy. This service policy defines the admission, broadcasting and bandwidth required for a set of services on a communication domain. This service policy is implemented at various points in the network, points the behaviour of which is at least partly driven by this policy. Among these points are routers, applications or others. All these points constitute points for implementing the service policy, or PEPs (Policy Enforcement Points).

The physical links that are the most tricky to manage are radio links. These links are subject to high variations in their bandwidth according to their environment and are subject to attenuation, interference or the like, which dynamically degrades their transmission capacities. The variations in bandwidth of these radio links have an impact on the service policy. They cause a variable congestion level in the link. The service policy must therefore advantageously take into account this congestion level. In the absence of such consideration, it is necessary to configure the service policy for a minimum bandwidth and therefore to under-use the radio link. This is particularly detrimental for satellite radio links where the bandwidth is precious and expensive.

It is also usual to interconnect various domains each having their service policy and able to be subject to different security constraints. FIG. 1 illustrates an example of network architecture illustrating this mechanism. A first communication network 1.6 includes a radio link 1.1. This radio link, typically a satellite link but any other radio technology could be used, operates by means of two modulators/demodulators or modems 1.2 and 1.3, one located before the link and the other after. Before the modem 1.2 there is a router 1.4. The same applies downstream, the router 1.5. The services therefore pass through the domain in the form of data streams using the radio link. Other routers, not shown, may be connected to these routers. It is considered here that the router 1.4 is the boundary of the domain 1.6. In this regard, it is one of the points implementing the service policy. In this regard, it imposes the rules of the current service policy on the various streams and requests entering the domain at its level. The radio link 1.1, therefore subject to bandwidth variations, has an influence on the actual ability of the incoming services at the router 1.4 to properly pass through the domain 1.6. It is therefore advantageous to pass on the information on bandwidth actually available on the link 1.1 at the level of the service policy applied at the point 1.4. This can be done by feeding back information on the congestion level from the modem 1.2 upstream of the radio link to a module 1.12 managing the service policy. This module, then being informed of the changes in the bandwidth actually available on the link 1.1, can accordingly modify the service policy and reflect its modifications in particular to the router 1.4. These modifications will also have an impact on all the actors in this service policy, the application level among other things, this not being shown in the figure.

If a second domain were to be considered, here the domain 1.7, connected to the domain 1.6 as shown in the figure, the important point is here the security of this domain. The domain 1.7 is a domain having a higher security level than the domain 1.6, for which it uses the services. The high-security network is referred to as red network and the low-security network is referred to as black network. The red network 1.7 communicates with the black network 1.6 through security gateways 1.8 and 1.9 in charge of filtering and encrypting the traffic. The red traffic coming from the router 1.11 is therefore encrypted by the security gateway 1.8. It next passes through the black network 1.6 and in particular through the radio link 1.1. It is decrypted by the security gateway 1.9 at the output from the black network towards a red router 1.10. The domain 1.7 must therefore be considered to be a special domain in the sense of services having its own service policy managed by a service policy management module 1.13. This policy is applied by means of instructions 1.15 vis-à-vis policy implementation points including the router 1.11 upstream of the black network and the link 1.1. The domain 1.7 is also special because of its high security level making it a red network.

When the bandwidth variation on the radio link 1.1 by the service policy both of the red network and of the black network is considered, it should be noted that this requires to be coordinated. As a matter of fact, seen from the black network, the radio link will pass services that are also qualified as black services but some of which are in fact streams transporting, in encrypted form, streams coming from red services. The red services are therefore subject on one hand to the service policy of the red network in the red domain and on the other hand to the service policy of the black domain when they pass through this domain. The consideration, by the manager 1.13 of the service policy of the red domain, of the bandwidth variations on the radio link in the black domain requires a feedback of information 1.14 between the modem 1.2 and this manager 1.13. Alternatively, we could consider that the service policy manager 1.13 of the red domain communicates with that one 1.12 of the black domain in order to harmonise their policy. Another alternative consists of designing the service policy manager 1.13 of the red domain and that one 1.12 of the black domain as a whole, in order to harmonise their service policy. These embodiments require a communication of information from the black domain to the red domain, which constitutes a security weakness.

The invention aims at solving the above problems by means of a method of managing the service policy applied to a black network comprising a radio link and a red network connected to this black network managed by a predetermined set of profiles. Congestion on the radio link is detected by any means by the black domain. Congestion on the radio link is detected by a congestion detection method operating by means of exchanges in the red domain. A service policy profile then established corresponds for each domain to a detected congestion level. This method is applicable to a network with more than two security levels.

In this way, by means of the predefined profiles and the independent detection of congestion on the radio link in each domain, coherence is enabled for the service policies implemented in the two domains according to the congestion level on the radio link with no need to exchange information fed back from the black domain to the red domain, guaranteeing in fact perfect isolation of the security domains in question.

The invention concerns a telecommunication network, said network consisting of a first security domain, called black domain, comprising at least one radio link, at least one second domain with higher security, called red domain, connected to the black domain, characterised in that it includes: a list of profiles, each containing a set of parameters applicable to the management of the service policy for the black domain, each profile being adapted to a given congestion level on the radio link; a list of profiles, each containing a set of parameters applicable to the management of the service policy for each red domain, each profile being adapted to a given level of congestion on the radio link; means for detecting the congestion level on the radio link in the black domain; means for detecting the congestion level on the radio link in each red domain, said detection being based solely on exchanges of messages in said red domain; means for selecting a new profile adapted to the congestion level of the radio link in the case of detection of a change in said congestion level in the black domain, and means for selecting a new profile adapted to a congestion level on the radio link in the case of detection of a change in said congestion level in each red domain.

According to a particular embodiment of the invention, the black domain includes a black router upstream of the radio link that constitutes one of the points implementing the service policy of the black domain and that aggregates the traffic received from the red domain and the traffic coming from the black domain in order to produce a data stream towards the radio link.

According to a particular embodiment of the invention, the black domain includes a black router upstream of the radio link that constitutes one of the points implementing the service policy of the black domain, and a switch that aggregates the traffic received from said router of the black domain and the traffic coming from the red domain in order to produce a data stream towards the radio link.

According to a particular embodiment of the invention, the traffic coming from the red domain passes through a red router that constitutes one of the points implementing the service policy of the red domain and then through a security gateway in charge of encrypting said traffic.

The invention also concerns a method for managing the service policy in a telecommunication network, said network consisting of a first security domain, called black domain, comprising at least one radio link, at least one second domain with higher security, called red domain, connected to the black domain, characterised in that it includes a step of defining a list of profiles, each containing a set of parameters applicable to the management of the service policy for the black domain, each profile being adapted to a given congestion level of the radio link; a step of defining a list of profiles each containing a set of parameters applicable to the management of the service policy for each red domain, each profile being adapted to a given congestion level on the radio link; a step of detecting the congestion level on the radio link in the black domain; a step of detecting the congestion level on the radio link in each red domain, said detection being based solely on exchanges of messages in said red domain; a step of selecting a new profile adapted to the congestion level on the radio link in the case of detection of a change in said congestion level in the black domain and a step of selecting a new profile adapted to a congestion level on the radio link in the case of detection of a change in said congestion level in each red domain.

The features of the invention mentioned above, as well as others, will emerge more clearly from a reading of the following description of an example embodiment, said description being given in relation to the accompanying drawings, among which:

Figure 1:
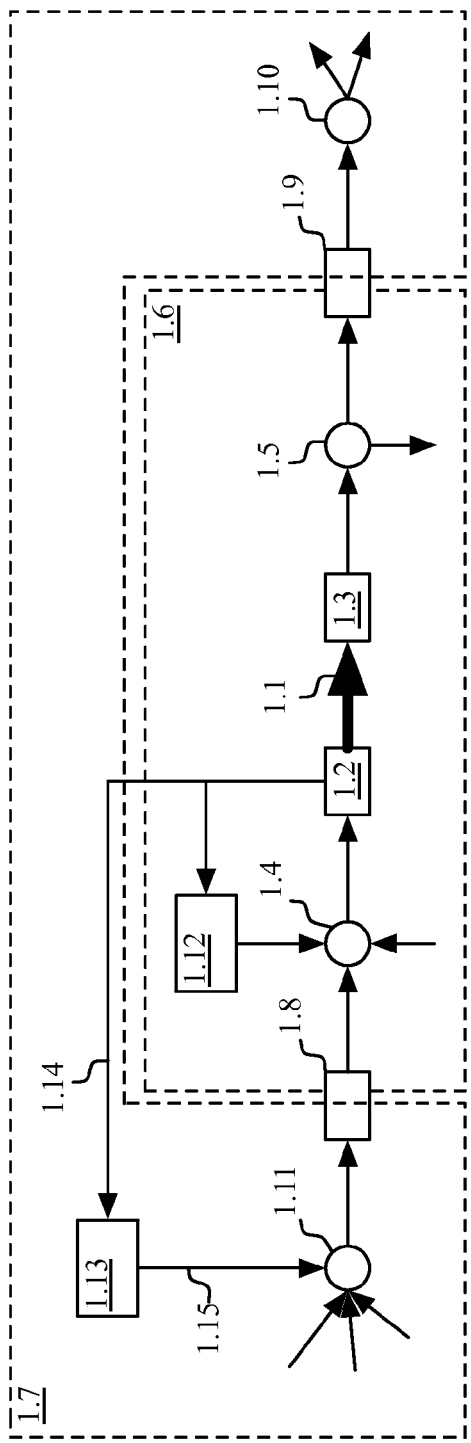
FIG. 1 illustrates an example of architecture of a network interconnecting two security domains.
Figure 2:
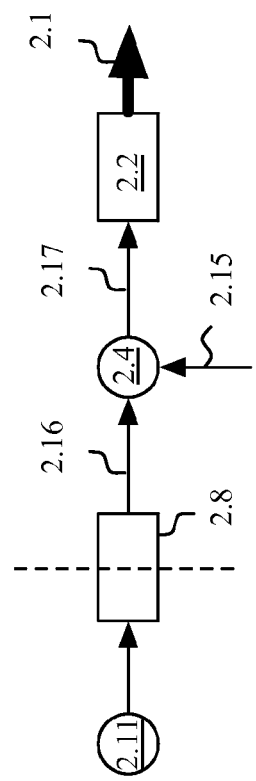
FIG. 2 illustrates an example embodiment of the admission of services upstream of the radio link.

FIG. 2 illustrates an example embodiment of the admission of services upstream of the radio link 2.1. The elements described in FIG. 1 are presented again with the same minor numbers. It can be seen that the black router 2.4 upstream of the modulator 2.2 of the link receives two types of traffic. A first type of traffic referenced 2.15 is black traffic coming from the black domain. Although shown by a single arrow, this traffic may be composed of multiple links at the input of the router 2.4. This traffic is present again as a component of the traffic 2.17 at the output from the router. It also receives traffic 2.16 coming from the security gateway and prior to a red router 2.11. This traffic is therefore red before the protected gateway. After 2.16, it forms part of the black domain and is therefore also considered to be black. However, black traffic transports red traffic in encrypted form. Seen from the black router 2.4, it receives as an input a set of services 2.15 and 2.16, which it aggregates as an output in order to produce a data stream 2.17 towards the link. For it, all these services are black and it applies a defined service policy thereto. A potential differentiation may then be made in the configuration of the service policy. In this diagram, the red services undergo a first so-called red service policy applied in the red domain by the red router 2.11 or any other means upstream of the passage in the black domain. These same services undergo a second black service policy applied in the black domain by the black router 2.4, or any other means, to the black services that transport them.

Advantageously, the service policy includes an admission control service where the admission of the services depends on the granularity of the topology of the network, the link or links and/or partitioning of the topology of the link.

A second diagram can be foreseen. This is the diagram illustrated by FIG. 3; the minor references correspond to FIG. 2. In this diagram, the router 3.4, which is one of the points implementing the service policy of the black domain, is not in series with the traffic coming from the red domain 3.16. The traffic coming from the red domain and the purely black traffic are connected by a switch 3.18, which is not a service policy implementation point. In this new diagram, the black service policy is not applied to the services carrying red traffic. The red services are then subject only to the red service policy implemented by the red router 3.11, which is one of the points implementing the service policy of the red domain.

Congestion on the radio link can be detected by any means in the black domain. It can be done in a traditional way by an explicit method such as the feedback of information from the modem 1.2 to the service policy management module 1.12. Any other method can also be foreseen, for example implicit methods such as a comparison of the rates sent by the router 1.4 with the rate received by the router 1.5 or an analysis of the traffic jitter.

The problem is more tricky with regard to the detection of congestion in the red domain. To guarantee perfect partitioning of the domains, it is not desired to create a data link going back from the black domain to the red domain or any feedback of black domain congestion information to the red domain via the security gateway. Sending back any congestion information available at the modem 1.2 to the service policy management module 1.13 of the red domain cannot therefore be foreseen.

It is therefore necessary to use a method for detecting congestion on the radio link based solely on exchanges of messages in the red domain. Such methods exist. French patent application number 10/04220 of the same applicant can for example be cited. This method is based on a periodic measurement of the rate sent by the red router 1.15 to the security gateway 1.8 and the rate received by the red router 1.10 coming from the security gateway 1.9. These rate measurements are exchanged between the two red routers in the form of red messages. In practice, they are typically messages of layer 3 of the OSI model. When a received rate less than the sent rate is detected, congestion of the radio link is deduced therefrom. Using such a congestion detection method therefore enables the module managing the service policy of the red domain to become aware of the state of congestion of the radio link in the black domain without requiring any transmission of information between the black domain and the red.

Once the methods for detecting congestion on the radio link particular to each domain are established, it is also necessary to ensure consistency between the service policies applied in response to a congestion, in order to ensure harmonious management of the radio link. For this purpose, a set of service profiles is established in each domain. Each service profile contains a set of parameters defining a service policy. At a given instant, one of these profiles is active. This means that the service policy applied at this instant by the module managing the service policy of the domain uses the parameters of said profile for managing the service policy. When a congestion on the radio link is detected, a change in the active profile and therefore a change in the service policy of the domain is caused. In this way, a match is established between the congestion level detected and a given service policy profile. Consistency is thus afforded by the configuration of the different profiles.

Consistency is also due to the fact that a degradation of the available bandwidth at the radio link would cause a loss of packets in the traffic passing over this link. This loss of packets typically affects the various services in a uniform manner. Because of this, the congestion level is detected homogeneously by the various domains.

Figure 3:
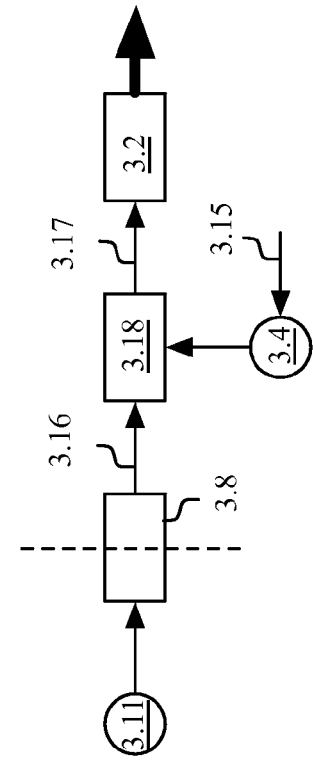
FIG. 3 illustrates another example embodiment of the admission of services upstream of the radio link.

This configuration is done according to the topology of the black domain. In the case illustrated by FIG. 2, where the router that implements the service policy of the black level is in series with the data stream of the red services, the parameterising of the profiles must take account of the fact that these red services are subject to the service policies of the two domains. Conversely, in a topology as illustrated by FIG. 3, this is not the case. The red services are subject only to the red service policy and then access the link through the black domain without any obstacle.

The method for detecting the congestion on the radio link implemented in the red domain means that a congestion is detected only in the case of red traffic passing over the link. This is because, if congestion occurs because of the black traffic and at that moment no red traffic is passing, this congestion will be detected by the black domain but not by the red domain. The active profile of the red domain will therefore remain a profile corresponding to a non-congested link. This is not problematic, because of the absence of red traffic. If red traffic appears, it will be subject to the service policy adapted to a link without congestion. Very rapidly, the congestion will be detected since it will produce a difference between the sent rate and the received rate. This detection will cause a switching of profile in the red domain. In the presence of red traffic, the service policy therefore adapts automatically to the current actual state of congestion of the link.

This phenomenon may also occur in the black domain according to the used method for detecting traffic. In particular, if a detection method based, as in the red domain, on a measurement of actual rate is used, congestion will be detected only in the case of actual black traffic. And again, this occurs only in the so-called parallel topology illustrated by FIG. 3. In the so-called series topology illustrated by FIG. 2, in the absence of black traffic, congestion can be caused only by red traffic. Since this red traffic appears as black traffic to the black router 2.4, it automatically participates in the measurement of congestion in the black domain. One therefore observes that congestion on the link is then automatically detected in the black domain whether or not there is any purely black traffic at this moment.

These considerations show that the moment of switching from one service policy profile to another in order to adapt it to a congestion level may be offset in time with respect to the moment of the congestion. This however occurs only in the absence of traffic in the domain concerned. As soon as traffic appears, congestion is detected and the profile is adapted. We therefore have a set of profiles selected at a given moment that is always adapted to a congestion level on the radio link and the reality of the traffic in the domain in question.

Figure 4:
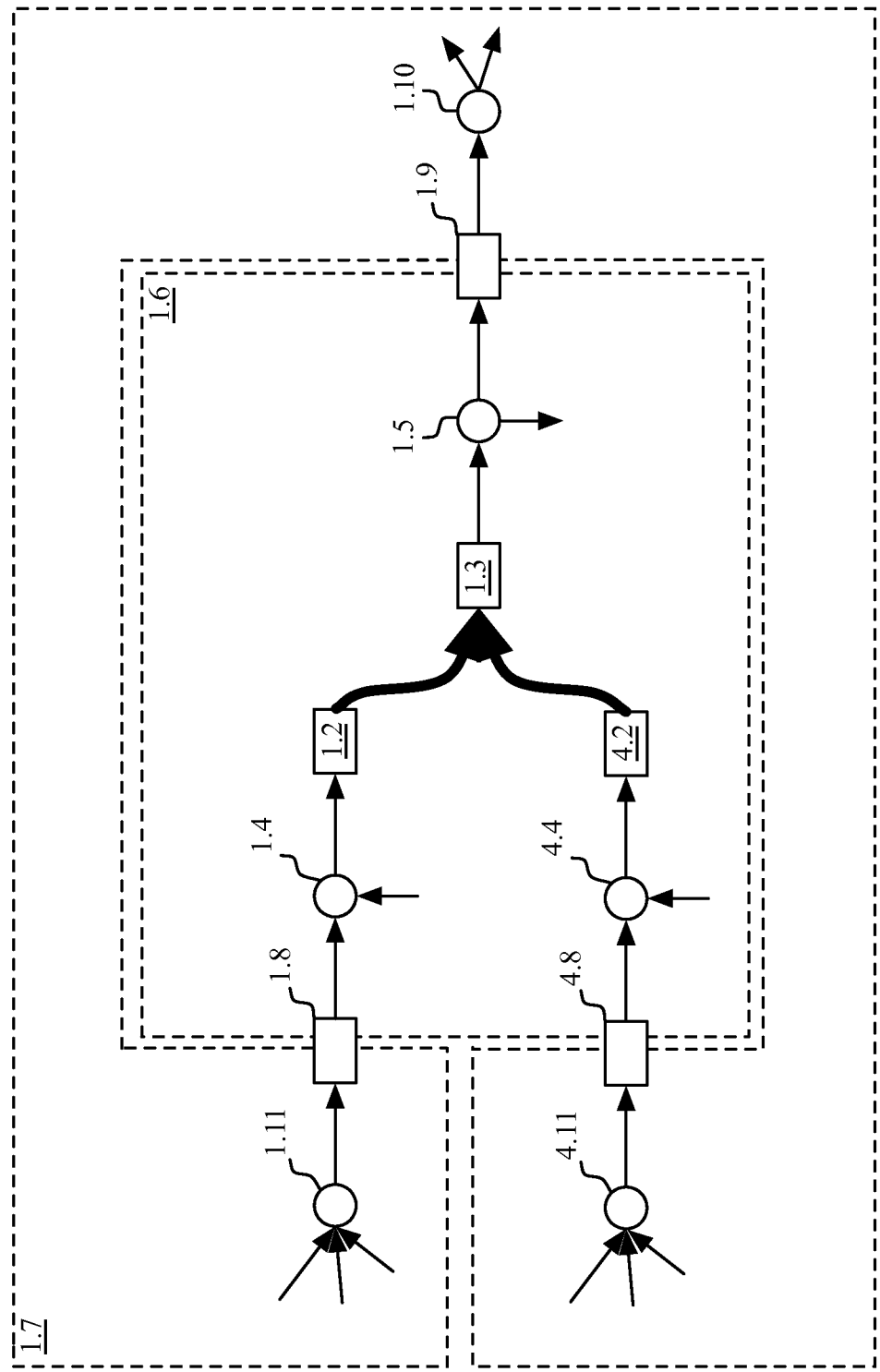
FIG. 4 illustrates an example of a network architecture based on a multipoint-to-point radio link.

The described method operates whatever the topology of the radio link in question. It includes the multipoint-to-point topologies as illustrated by FIG. 4. This figure repeats the references in FIG. 1, except for the second chain comprising the second red router 4.11, the second security gateway 4.8, the black router 4.4 and the modem 4.2. In this topology, the red services follow two connection paths to the same destination. Red profiles are defined homogenously and apply to each of these communication paths. The method adapts using a method for detecting the congestion on the link that will add the rates leaving the red routers 1.11 and 4.11 and compare them with the rate entering the red router 1.10 on reception. The same type of adaptation is made in the congestion detection method used in the black domain. The same applies to a point-to-multipoint topology.

Figure 5:
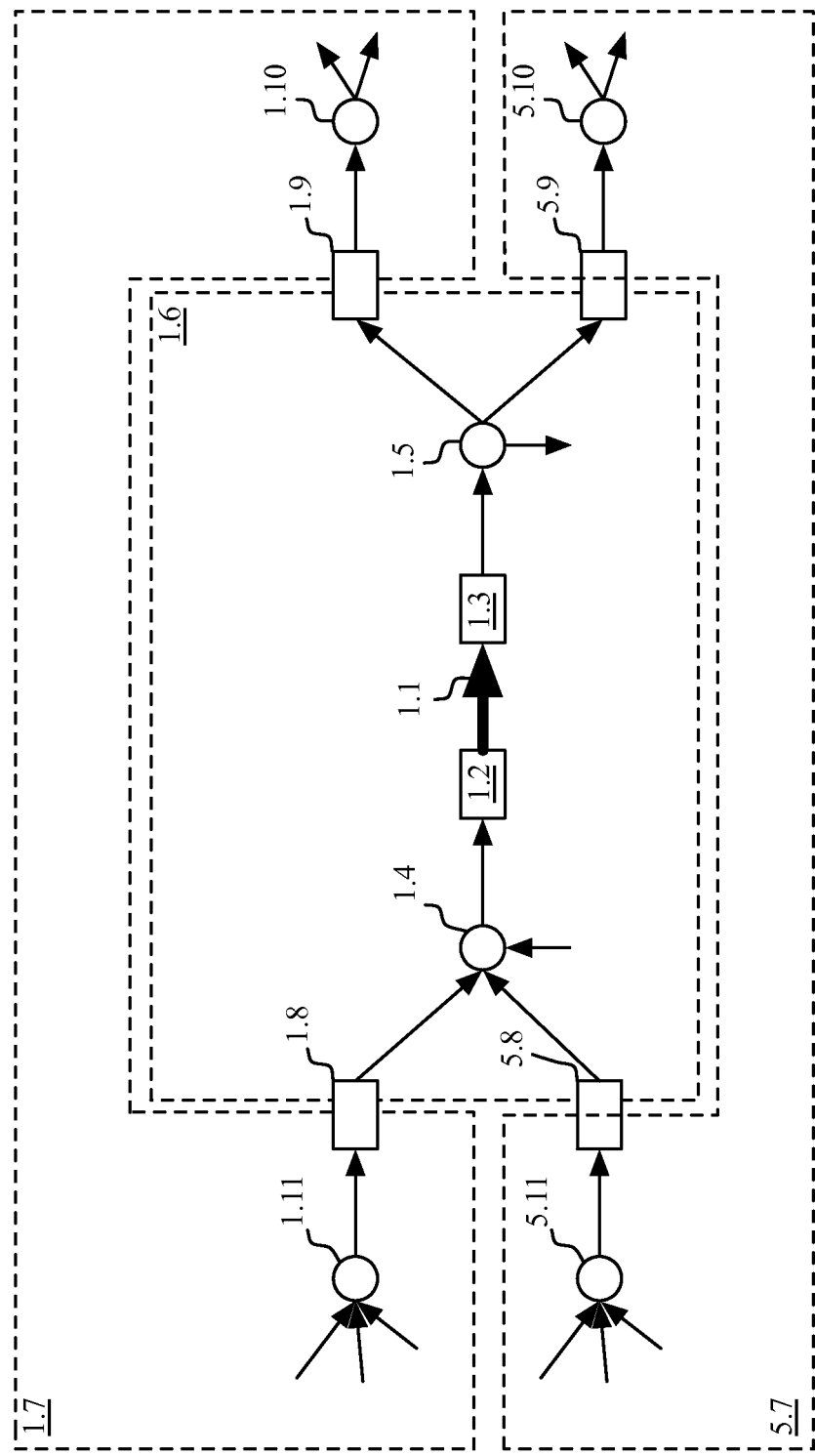
FIG. 5 illustrates an example of a network architecture comprising two red networks.

The method can also apply to a plurality of secure networks and therefore qualified as red domains, as illustrated by FIG. 5. In this figure, the references in FIG. 1 are repeated. A second secure domain 5.7 is connected to the black domain 1.6. This domain includes a red upstream router 5.11 connected to a security gateway 5.8. This gateway is connected to the same black router 1.4 as the security gateway of the first red domain 1.7. Downstream, the traffic coming from the black domain is redirected according to its origin to one of the security gateways 1.9 for the first red domain 1.7 and to the security gateway 5.9 for the second. It is then redirected to the red router 5.10 for this second red domain. The security levels implemented in the two red domains may be different or equal depending on the embodiments. This example extends to any number of secure domains. Each of the domains will apply a service policy that is particular thereto. Each of these policies results in a set of service profiles implemented in said domain. The parameterising of these sets of profiles ensures consistency of the service policy between the various domains. Each domain implements a method for detecting congestion on the radio link that is particular thereto and does not involve any exchanges of messages from the black domain to one of the red domains. The active profile at a given instant in each domain is always adapted to the level of congestion of the radio link and the reality of the traffic in the domain in question.

Figure 6:
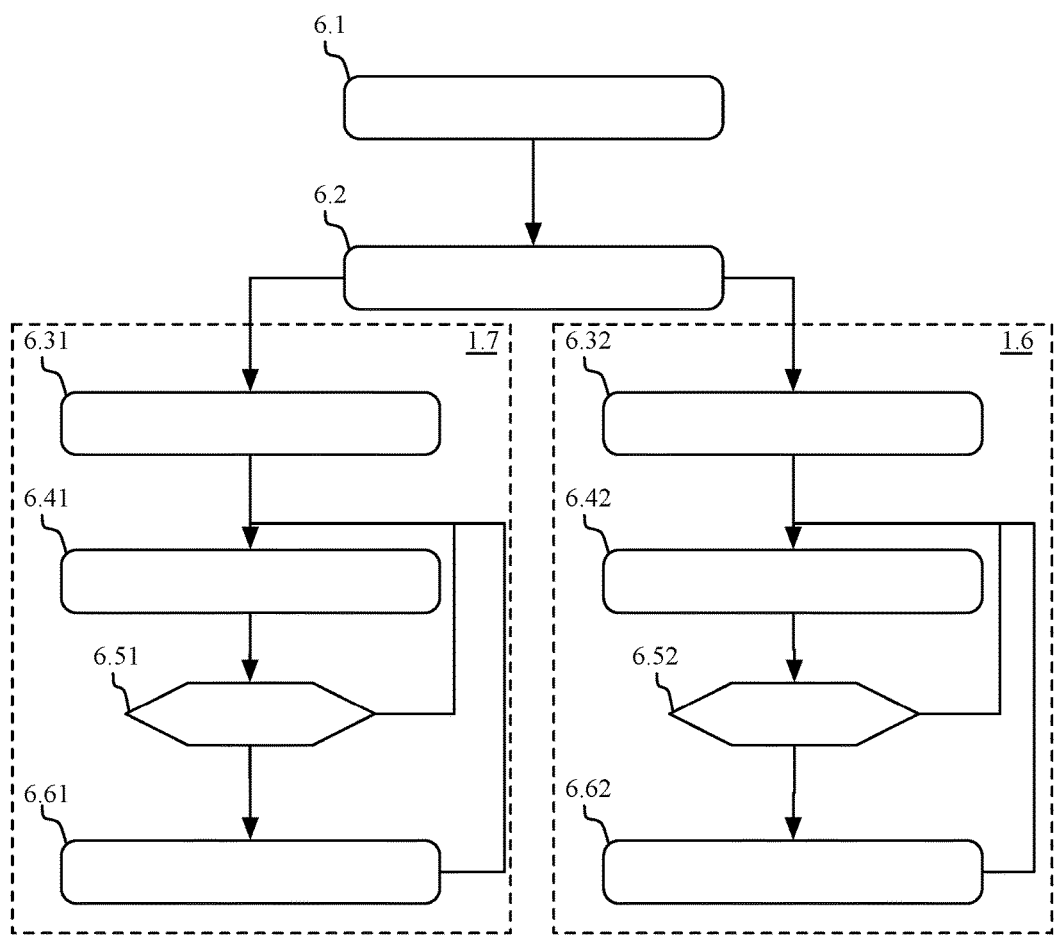
FIG. 6 illustrates the flow diagram of the method for managing the service policy according to an example embodiment of the invention.

An example of a method for managing the service policy according to the invention is illustrated in FIG. 6. During a first step 6.1, a list of profiles is defined for the black domain. Each profile contains a set of parameters applicable to the management of the service policy. The result is therefore a list, the first profile of which corresponds to the service policy required for the black domain in the absence of congestion on the radio link. This will be the default active profile. The following profiles are adapted to a greater and greater congestion level on the link. During a second step 6.2, a list of profiles is likewise defined for the red domain. Once these profiles are consistently defined, they are established in each domain. According to the example embodiment of the invention illustrated by FIG. 6, there are two domains: a red domain 1.7 and a black domain 1.6. The module for managing the service policy of each domain selects a profile in the list of profiles defined for its domain during step 6.31 for the red domain and 6.32 for the black domain. Advantageously, the first profile intended for the policy required in the absence of congestion is selected by default as the active profile in each domain. Each domain then uses its method for detecting congestion. This is done during step 6.41 in the red domain and 6.42 in the black domain. The method for detecting congestion in the black domain can use any explicit or implicit detection technique. Direct measurement of the bandwidth at the modem, use of an error rate, the comparison of the sent and received rates or others can be cited. These methods are applied to the link whatever its topology among the following topologies: point-to-point, point-to-multipoint and multipoint-to-point.

During step 6.51 in the red domain and 6.52 in the black domain, the state of congestion on the link is tested. This test may be done in a regular manner or be asynchronously triggered by a modification of the state of the link, typically upon interrupt. The test consists of detecting a modification of the congestion level. When such a modification is detected, step 6.61 is performed if in the red domain or step 6.62 if in the black domain, in order to select a new profile taking account of the new congestion level.

Thus, the profile used by the service policy of each domain is always consistent with the congestion level detected on the link. According to the congestion detection method used, it is possible that the two domains do not detect congestion and therefore do not perform the profile switching in a synchronised manner. This may occur in the case of absence of traffic in the domain. In this case, any delay in the detection has no effect since precisely there is no traffic on the link in the concerned domain.

The invention therefore enables managing a consistent service policy over all the security domains using a radio link, without requiring a transfer of information between the domains and therefore without weakening the security mechanisms established based on the security gateways.

The invention claimed is:

1. A telecommunication network, said network comprising a first security domain, called black domain, comprising at least one radio link, at least one second domain with higher security, called red domain, connected to the black domain, said telecommunication network including:
a first predefined list of profiles, each profile of the first predefined list containing a set of parameters applicable to the management of the service policy for the black domain, the profiles of the first predefined list being adapted to respective congestion levels on the radio link;
a second predefined list of profiles, each profile of the second predefined list containing a set of parameters applicable to the management of the service policy for each red domain, the profiles of the second predefined list being adapted to respective congestion levels on the radio link;

said first and second predefined lists being predefined so that a service policy profile correspond to a detected congestion level, for all domains and in a consistent manner between the domains, the parameters of the profiles of the first and second predefined lists being defined according to the topology of the black domain, wherein, once the first and second predefined list of profiles are established in their respective domains, the black domain is configured for:

performing a first detection of congestion level on the radio link in the black domain;

selecting a first profile among the profiles of the first predefined list, the first profile being adapted to the congestion level of the radio link detected in the black domain;

and wherein, once the first and second predefined list of profiles are established in their respective domains, each red domain is configured for:

performing a second detection of congestion level on the radio link in said red domain, said second detection being based solely on exchanges of messages in said red domain; and selecting a second profile among the profiles of the second predefined list established in said red domain, the second profile being adapted to the congestion level of the radio link detected in said red domain.

2. The telecommunication network according to claim 1, wherein the black domain includes a black router upstream of the radio link, which constitutes one of the points implementing the service policy of the black domain and which aggregates the traffic received from the red domain and the traffic coming from the black domain in order to produce a data stream towards the radio link.

3. The telecommunication network according to claim 1, the black domain includes a black router upstream of the radio link, which constitutes one of the points implementing the service policy of the black domain, and a switch that aggregates the traffic received from said router of the black domain and the traffic coming from the red domain in order to produce a data stream towards the radio link.

4. The telecommunication network according to claim 1, wherein the traffic coming from the red domain passes through a red router that constitutes one of the points implementing the service policy of the red domain and then through a security gateway in charge of encrypting said traffic.

5. A method for managing the service policy in a telecommunication network, said network comprising a first security domain, called black domain, comprising at least one radio link, at least one second domain with higher security, called red domain, connected to the black domain, said method including:

defining a first list of profiles, each profile of the first list containing a set of parameters applicable to the management of the service policy for the black domain, the profiles of the first list being adapted to respective congestion levels of the radio link;

defining a second list of profiles, each profile of the second list containing a set of parameters applicable to the management of the service policy for each red domain, the profiles of the second list being adapted to respective congestion levels on the radio link;

said first and second lists being predefined so that a service policy profile correspond to a detected congestion level, for all domains and in a consistent manner between the domains, the parameters of the profiles of the first and second predefined lists being defined according to the topology of the black domain, wherein, once the first and second predefined list of profiles are established in their respective domains, the black domain:

performs a first detection of congestion level on the radio link in the black domain;

selecting a first profile among the profiles of the first predefined list, the first profile being adapted to the congestion level on the radio link detected in the black domain;

and wherein, once the first and second predefined list of profiles are established in their respective domains, each red domain:

performs a second detection of congestion level on the radio link in said red domain, said second detection being based solely on exchanges of messages in said red domain; and selecting a second profile among the profiles of the second predefined list established in said red domain, the second profile being adapted to the congestion level detected in said red domain.

* * * * *